United States Patent [19]

Chin et al.

[11] Patent Number: 5,250,161

[45] Date of Patent: Oct. 5, 1993

[54] ELECTROCHEMICAL DESENSITIZATION PROCESS

[75] Inventors: George Chin, Citrus Heights; Rex M. Smith; Michael K. Wong, both of Sacramento; Patrick J. Wagner, Citrus Heights, all of Calif.

[73] Assignee: Aerojet-General Corporation, Rancho Cordova, Calif.

[21] Appl. No.: 904,813

[22] Filed: Jun. 26, 1992

Related U.S. Application Data

[63] Continuation-in-part of Ser. No. 821,349, Jan. 21, 1992, abandoned, which is a continuation-in-part of Ser. No. 645,382, Jan. 24, 1991, abandoned.

[51] Int. Cl.$^5$ .................................................. C25F 5/00
[52] U.S. Cl. .................................. 204/131; 204/130; 204/149; 204/72; 588/202; 588/203; 588/204; 588/222; 588/227
[58] Field of Search .............. 204/130, 131, 149, 72; 588/202, 203, 204, 222, 227

[56] References Cited

U.S. PATENT DOCUMENTS

| | | | |
|---|---|---|---|
| 700,670 | 3/1902 | Buchner | 204/74 |
| 700,672 | 3/1902 | Buchner | 205/74 |
| 736,204 | 8/1903 | Buchner | 204/74 |
| 736,205 | 8/1903 | Buchner | 204/74 |
| 761,284 | 5/1904 | Buchner | 204/74 |
| 1,926,837 | 9/1933 | Cupery | 204/9 |
| 2,485,982 | 10/1949 | McMillan | 204/74 |
| 3,103,473 | 9/1963 | Juda | 204/77 |
| 3,338,806 | 8/1967 | Harwood | 204/74 |
| 3,455,986 | 7/1969 | Jones | 260/465.8 |
| 3,719,570 | 3/1973 | Lancy | 204/151 |
| 3,730,684 | 3/1973 | Demetriou | 23/230 |
| 4,125,445 | 11/1978 | Hurley | 204/149 |
| 4,443,309 | 4/1984 | Van Duin et al. | 204/149 |
| 4,830,717 | 5/1989 | Rignon et al. | 204/74 |
| 4,872,959 | 10/1989 | Herbst et al. | 204/109 |
| 4,874,485 | 10/1989 | Steele | 204/130 |
| 4,925,643 | 5/1990 | Steele | 423/393 |

FOREIGN PATENT DOCUMENTS

0319260 6/1989 European Pat. Off. .
2206341B 11/1990 United Kingdom .

*Primary Examiner*—John Niebling
*Assistant Examiner*—Arun S. Phasge
*Attorney, Agent, or Firm*—Townsend and Townsend Khourie and Crew

[57] ABSTRACT

Potentially hazardous compositions containing solid combustible fuels, oxidants, nitro-containing, nitramine-containing or nitrato-containing compounds and, in many cases, binders are desensitized by electrolysis at low current and over an extended period of time. According to one disclosed method, compositions containing binders are first oxidized at the anode to cause decomposition and swelling of the binder, followed by further oxidation of the remaining components of the composition or switching of the polarity to cause reduction, as needed. According to another disclosed method, the composition is retained in a reaction vessel separate from the electrolysis cell, and the aqueous leachant from the composition is circulated in two portions through the two halves of the electrolysis cell to form strong oxidizing and reducing reagents, respectively, which are then circulated in succession through the reaction vessel to decompose the composition. In either case, the resulting composition has a lowered sensitivity to initiation by such external influences as inadvertent impact or inadvertent electrostatic discharge.

15 Claims, 5 Drawing Sheets

ELECTROCHEMICAL DESENSITIZATION PROCESS

CROSS REFERENCE TO RELATED APPLICATION

This application is a continuation-in-part of co-pending application Ser. No. 07/821,349, filed Jan. 21, 1992 now abandoned, which is a continuation-in-part of co-pending application Ser. No. 07/645,382, filed Jan. 24, 1991 now abandoned.

This invention lies in the field of energetic compositions and their disposal.

BACKGROUND OF THE INVENTION

Compositions containing energetic compounds such as nitratoesters, nitramines and/or other nitro-group-bearing compounds, combustible fuels, oxidants and combinations of these are used for a variety of functions in a wide range of industrial and other types of applications. A problem commonly encountered with the use of such compositions is that they are difficult to dispose of in an ecologically acceptable manner. These compositions have a potential for the accidental or spontaneous initiation of a forceful reaction accompanied by the sudden release of a large amount of energy. Initiation may result from external influences such as an inadvertent impact or an accidental electrostatic discharge, and environmental and safety considerations require such a potential for danger to be reduced or avoided.

SUMMARY OF THE INVENTION

It has now been discovered that compositions of the type described above can be effectively desensitized, and thus rendered much less susceptible to inadvertent initiation, in a nonhazardous and controlled manner either by treatment reagents continuously regenerated by electrolysis or directly by electrolysis.

In certain embodiments of this invention, an electrolysis cell is used to separately generate strong oxidizing and reducing agents which are successively fed to a reaction vessel containing the energetic composition in slurry form. In the reaction vessel, the oxidizing agents react with the binder material that provides the solid energetic matter with structural integrity and limits access to the other components, such as energetic compounds, oxidizers, fuels, plasticizers, and binding agents. The action of the oxidizing agents exposes these other components for attack by the reducing agents which are then fed to the reaction vessel for reduction of the energetic components to a nonenergetic form. For the most efficient and effective operation, the strong oxidizing and reducing agents are generated in the electrolysis cell by electrolysis of the water-soluble salts which are leached out from the energetic composition itself. Using the composition itself in this manner, no chemicals other than those present in the energetic composition itself are required, except for the optional use of small amounts of additional oxidizing and reducing agents for startup purposes. Regeneration is conveniently achieved by the continuous circulation of the oxidizing and reducing solutions through the electrolysis cell, the cell being divided into half-cells separated by an ion-permeable membrane. This electrolytic regeneration may be continued while the oxidative decomposition is occurring in the slurry, while the reductive decomposition is occurring, or during both the oxidative and reductive stages. Individual retaining tanks for the oxidative and reductive solutions are preferably used, permitting circulation from any one of these tanks to both the appropriate half-cell and the reaction vessel at the same time.

In other embodiments of this invention, the composition, again in the form of a slurry, is placed in contact with two electrodes and an electric current is passed from one to the other through the composition. One or more of the active components in the composition undergoes an electrolytic conversion in an oxidation or reduction reaction (or both) at the appropriate electrode, thereby lowering the susceptibility of the composition to initiation. This method is applicable for example to compositions which include nitro-group-bearing compounds, fuels and oxidants, as well as other components. Several reactions occur simultaneously in these compositions, including the reduction of nitro groups on the nitro-group-bearing compounds to amino groups or to alcohol (—OH) groups and nitrogen gas, the reduction of oxidants, and the oxidation of fuels. Other components of the composition which are susceptible to oxidation or reduction, such as binder materials and other additives, also undergo conversion. The current is continued long enough to desensitize the composition to a sufficiently to render it suitable for disposal.

The invention is generally applicable to solid energetic compositions. The liquid used to form a slurry of such a composition is one which will promote the transport of ions in response to the electric current, and preferably one which will dissolve one or more of the components of the composition to produce a dissolved electrolyte and facilitate the contact of the composition with the reagents produced by the electrolysis. The efficiency of the process will generally increase as the contact area between the solid and the liquid increases, and thus, higher degrees of maceration, i.e., smaller solid particles, will generally result in improved efficiencies.

In embodiments of the invention where the solid composition is placed directly in the electrolysis cell and contains a binder, the composition is placed closer to one of the two electrodes than to the other, and preferably in contact with the closer electrode. The electrodes are then energized through a polarity switch which enables one to reverse the polarity. The electrode which is closer to the solid composition (i.e., the working electrode) is first energized as an anode, thereby causing the binder to oxidize. This oxidation and resulting decomposition of the binder cause the composition to swell, thereby improving access of the ions produced by the electric current to the other components of the composition. The polarity is then either maintained or switched, depending on the remaining materials to be decomposed and the type of decomposition reaction required. For reduction reactions, the working electrode is switched to a negative polarity (cathode), whereas for oxidation reactions, the working electrode is held at a positive polarity (anode). When energetic nitro, nitramine or nitrato compounds are sought to be decomposed, for example, a negative polarity is applied to the working electrode.

Advantages of the invention include the elimination of the need for special solvents otherwise required in the disposal of such materials, the ability of the invention to permit the decomposition of two or more sensitive components simultaneously, the ability to decompose the components with electricity at low current density and voltage, and the ability to conduct the decomposition with simple, readily constructed equipment. Other features, objects and advantages of the invention will become apparent from the description which follows.

DETAILED DESCRIPTION OF THE INVENTION AND PREFERRED EMBODIMENTS

Figure 1:
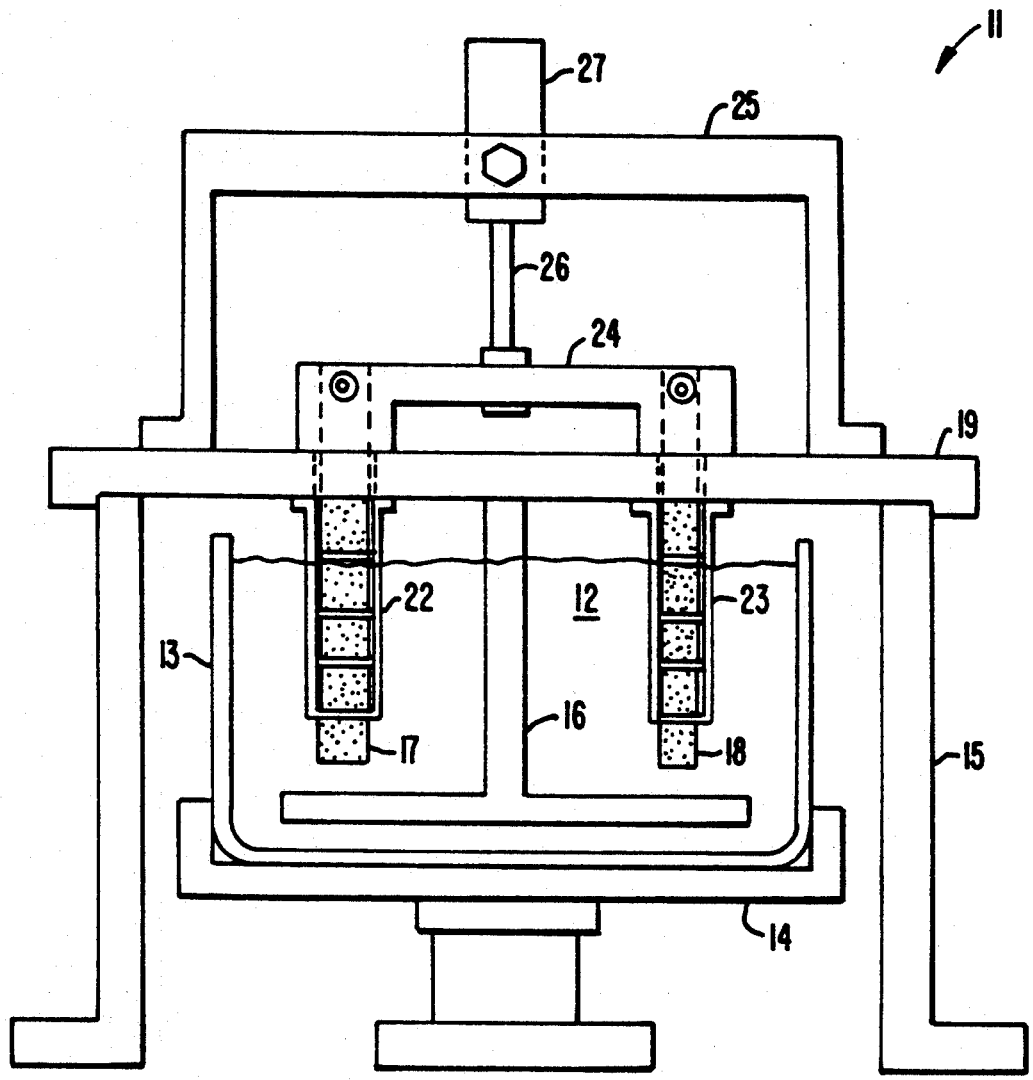
FIG. 1 is a side view of a desensitizing processor which can be used in the practice of certain embodiments of the present invention.

The present invention is applicable to a wide range of compositions of the type described above, including various formulations of propellants and explosives. Examples are single-base propellants, double-base propellants, cast double-base propellants, crosslinked propellants, single-component and multi-component explosives and plastic-bonded explosives. These compositions typically include explosive components, oxidants, fuels, and binders, the latter including both energetic and nonenergetic substances, including fuel-rich and/or oxidizer-rich binders, and other additives such as plasticizers, bonding agents, extenders, catalysts, stabilizers, lubricants and other types of modifiers, fillers and functional substances. Examples of specific energetic components, including oxidizers, are ammonium nitrate (AN), ammonium perchlorate (AP), ammonium picrate, 2,4-diamino-1,3,5-trinitrobenzene (DATB), diazodinitrophenol (DDNP), diethylnitramine dinitrate (DINA), ethylenedinitramine (EDNA), ethylene glycol dinitrate (EGDN), cyclotetramethylene tetranitramine (HMX), lead azide, lead styphnate, mannitol hexanitrate (MN), mercury fulminate, nitrocellulose (NC), nitroglycerin (NG), nitromethane (NM), pentaerythritol tetranitrate (PETN), picric acid (PA), cyclotrimethylene trinitramine (RDX), trinitrophenylmethylnitramine ("Tetryl"), 2,2,2-trinitroethyl 4,4,4-trinitrobutyrate (TNETB), tetrazene, tetranitromethane (TNM), 2,4,6-trinitrotoluene (TNT), and 2-nitrodiphenylamine (2NDPA). Examples of fuels included in these compositions are aluminum and other metals or metal hydrides. Examples of binders and other additives, which are also part of the fuel, are polysulfides, polyurethanes, polybutadienes, triacetin, resorcinol, and graphite. These lists are not exhaustive, but merely illustrative of the types of materials included in compositions which can be treated in accordance with this invention.

The form in which the composition is desensitized in accordance with this invention is not critical, provided that it is capable of chemical attack by oxidizing and reducing agents. Many compositions to which the invention is applicable are solid in form prior to treatment, and certain of these will be capable of desensitzation in solid form, depending on the composition itself and the electrolysis apparatus.

In most cases involving solid compositions, however, best results will be obtained by first forming a slurry of the composition, and preferably an aqueous slurry. Propellant grains are typically removed from rocket motors by hydromining, i.e., the loosening and breaking up of the grain by jets of high-pressure water. To prepare the grain for processing in accordance with the present invention, the broken grain pieces are then recovered and macerated by conventional techniques, and combined with water to form the slurry. The macerated particles are preferably less than about 1.0 inch (2.54 cm) in diameter, and most preferably about 0.25 inch (0.635 cm) in diameter or less. The wastewater from the hydromining may be used to form the slurry, or may be used as the initial charge for the retaining tanks in those embodiments where retaining tanks are used, or both.

While aqueous slurries are the most convenient, the liquid used to form the slurry can be any liquid capable of conducting an electric current ionically. Polar liquids capable of dissolving salts, acids or bases to form an ionically conducting electrolyte are preferred. It is also preferred that the liquid be one which will partially dissolve one or more of the active components of the composition, i.e., those which are the source of the detonation risk. This will help leach out some of the active component and enhance its decomposition.

Examples of polar liquids other than water and aqueous media in general are low molecular weight alcohols such as methanol, ethanol, propanol, isopropanol, butanol and isobutanol, and ketones such as acetone, methyl ethyl ketone, and methyl isobutyl ketone. Other possibilities and examples will readily occur to those skilled in the art. Water is preferred for purposes of low cost, safety and ease of use.

The amount of liquid used to form the slurry is also not critical, and will be selected primarily on the basis of practical considerations of equipment scale, and ease of handling, processing and transferring. In most cases, the proportion of liquid actually used will range from about 30% to about 90% by volume of the slurry, with amounts between about 50% and about 75% preferred. In the presently preferred practice of the invention, sufficient liquid is added to produce a slurry with a volume of 1.6 times the volume of the dry energetic composition.

In embodiments of the invention where the slurry itself is placed in the electrolysis cell, additives which are not part of the composition itself may be incorporated in the slurry as an optical variation to enhance and accelerate the electrolysis. Such additives may for example be materials that increase the electrical conductivity of the slurry, and also materials that degrade the nitro-, nitramine- and nitrato-containing compounds present in the composition. Examples of such additives are alkali metal, alkaline earth metal and ammonium hydroxides or other water-soluble inorganic bases, water-soluble acids and salts, and sulfides, sulfates, sulfites and polysulfides of alkali metals, alkaline earth metals and ammonia. Examples of alkali or alkaline earth metals are sodium, potassium, and calcium. Potassium is the most commonly used for nitro compound degradation and thus preferred. Additives of this kind are most conveniently used in solution, dissolved in polar solvents such as methanol, ethanol, acetone or dimethyl sulfoxide. Further optional additives are catalysts for the reactions taking place in the desensitization process. Metal catalysts in combination with hydrogen gas, for example, catalyze the reduction of energetic compounds. An example is iridium, which may be used in the form of iridium oxide, preferably as a coating on the electrode at which hydrogen gas is generated.

While the method of performing the electrolysis of the present invention is not critical, and may be varied widely while still obtaining acceptable and effective results, it is preferred that a low current density be used over an extended period of time. The term "current density" is used herein to denote the amount of current per unit area of electrode surface. In processing cells where the two electrodes differ significantly in surface area, the surface area used in determining the current density is that of the electrode which offers the highest resistance to current flow.

The process is to be conducted under such conditions of time, temperature and current density that the reactions which take place occur in a non-self-propagating manner, i.e., are not subject to spontaneous acceleration but are driven essentially entirely by the electric current. The optimum or preferred current for any particular application of this invention will depend on the scale of the process, including the amount of material to be treated, the size of the equipment, and the time period available for the treatment. In most cases, however, effective results are obtained with a current density not exceeding about 0.30 amps/cm$^2$, preferably not exceeding about 0.20 amps/cm$^2$. Currents as low as 0.01 amps/cm$^2$ will be useful and practical in certain small scale systems. The preferred range for most systems is therefore about 0.01 amps/cm$^2$ to about 0.20 amps/cm$^2$, with about 0.01 amps/cm$^2$ to about 0.03 amps/cm$^2$ particularly preferred.

In many cases, particularly those in which the energetic composition is placed directly in the electrolysis cell, it will be advantageous to gradually decrease the applied electrode potential (and hence the current) as desensitization proceeds. As the concentration of an energetic compound decreases, the applied potential may be lowered in the direction of the minimum activation potential, since progressively less reducing agent is required. Best results will be achieved by adjusting the potential art intervals to the lowest potential that will maintain the maximum negative slope for the depletion curve.

The temperature is not critical, the only consideration being that the temperature itself not create a hazardous situation or cause any substantial amount of vaporization. While the rate of desensitization increases with increasing temperature, the invention is readily and adequately conducted at ambient or room temperature, i.e., 20° to 25° C. Cooling of the system during the process is generally not required, and the temperature will frequently rise due to the electric current itself. In most cases, the rise will not be sufficient to require temperature control. In the preferred practice of the invention, the temperature is maintained at a level below about 140° F. (60° C.). The process can in fact be operated at room temperature.

The length of time during which the desensitization is permitted to proceed will be any duration which will achieve the desired degree of desensitization at the current used. In most cases, the duration will be greater than about twenty minutes, preferably greater than about 1 hour, and most preferably greater than about 4 hours.

The electrodes may be constructed of any of the materials which are known for use as electrodes. The actual material to be used may be varied widely. Selection of the material for any particular application, however, will be influenced by a number of factors. For example, preferred materials will generally be those which are the least susceptible to degradation from the passage of electric current. In certain systems, furthermore, the preferred materials will be those which are inert to the electrochemical reactions which will occur during the process. In certain other systems, it will be preferable to use electrodes which themselves become reduced or oxidized during the process. In still other systems, it will be preferable to use electrodes which absorb reactants or products of the electrochemical reactions occurring in the process.

With these considerations in mind, examples of types of materials from which the electrodes can be formed are metals, graphite, metal oxides and conducting polymers. Examples of specific metals are copper, silver, aluminum, platinum, titanium and zinc. Examples of metal oxides are $PbO_2$ (lead dioxide), $MnO_2$ (manganese dioxide) and $NiFe_2O_4$ (nickelous ferric oxide). Examples of conducting polymers are polyaniline, polyacetylene and polypyrrole. Each type of electrode will offer advantages for particular types of compositions being treated. For example, in systems where electrolysis results in hydrogen evolution, metals with high hydrogen overpotentials (also referred to as "high hydrogen overvoltages") may be used to reduce or eliminate the release of gaseous hydrogen. For systems where oxidation of the electrode may occur at the anode, metal oxides or noble metals are preferred in order to preserve the anode. Other reasons and motivations and the appropriate selections in each case will be apparent to those skilled in the art.

The configuration and spacing of the electrodes and the design and construction of the electrolysis cell are not critical, and will be varied according to the particular embodiment of the invention and the needs of the system. The cell may for example be a single-vessel cell, a partitioned cell, or two half-cells. The cell efficiency will depend at least in part on the electrode surface area, since the electrochemical reactions take place at the electrode surfaces. For systems in which the energetic composition in placed directly in the electrolysis cell, the electrodes will generally be spaced from about 1 cm to about 100 cm apart, preferably from about 3 cm to about 30 cm. For systems in which the energetic composition is placed in a separate reaction vessel and the electrolytic cell contains an ion-permeable membrane separating the electrodes from one another, the spacing between the ion-permeable membrane and either of the two electrodes will preferably be within the range of about 0.03 inch to about 0.3 inch (0.076 cm to 0.76 cm), and most preferably about 0.1 inch (0.25 cm).

The cell itself may be constructed of any inert material capable of withstanding the operating conditions and pH of the materials treated and used in the process. Nonconductive materials of construction such as plastic will generally be the most preferred, although a wide range of other materials may be used as well. Alternatively, the cell may be constructed of a conducting material with the cell walls serving as one of the electrodes. For slurries, particularly those in which the slurry itself is placed in the electrolytic cell, a mechanism for agitation or mixing of the slurry is preferably included, to keep the slurry in suspension and to expose the components of the composition to the electric current in an efficient and uniform manner. Solid deposits forming on the electrodes may be periodically or intermittently removed to maximize the electrode surface area to optimize the efficiency of the current flow. Further optional features include temperature detectors and voltage detectors, which may be placed on or near the electrodes or at any location in the cell, as well as pH probes.

Electrolysis may be conducted using any of a variety of electric current profiles. The actual type of current may be varied, although certain types may be preferable for treating certain compositions. In general, alternating current, direct current or pulsed current may be used. For alternating current, the frequency may vary and is not critical. For pulsed currents, each pulse will be direct current. The pulse duration however may vary. A computer is particularly useful for control of pulse switching and duration.

The degree to which the composition is decomposed in the practice of the invention is also noncritical and may vary. In cases where the composition is being treated for purposes of disposal and must meet specific requirements or conform to regulations before being disposed of, it is only necessary that the composition be decomposed to a sufficient degree that such requirements or regulations be met. It will generally not be necessary to proceed to substantially full decomposition of those components which present a hazard, i.e., to a degree where at most only trace amounts are present. In most cases, for example, it will be acceptable and sufficient to convert at least 30%, preferably at least about 70%, and preferably at least about 90%, of the nitro groups of the composition to amino groups. Likewise, it will in most cases be acceptable and sufficient to reduce at least about 30%, and preferably at least about 70%, of the oxidant contained in such compositions.

Turning now to FIG. 1, one example of an electrolytic cell 11 in which the process of the invention may be performed is shown. The slurry 12 to be desensitized is placed in an open-top vessel 13. The vessel 13 is supported on a turntable 14, electrically powered to rotate. The turntable may be constructed with the capability of being raised or lowered to place it in contact, or remove it from contact, with the other components of the structure entering the vessel through its opening from above.

Placed over the turntable 14 and vessel 13 are a support stand 15, constructed to span the vessel opening. Secured to the stand are a stirrer bar 16 and electrodes 17, 18, arranged to extend downward into the interior of the vessel 13 and thereby be submerged in the slurry 12. The stirrer bar 16 is rigidly attached to a first tier 19 of the support stand and remains stationary as the turntable 14 rotates.

The apparatus shown in FIG. 1 further includes a mechanism for scraping the electrodes clean of deposited solids. The electrodes in this example are rod-shaped, and the scraping mechanism consists of a pair of scraper cages 22, 23, each surrounding one of the electrodes with a small gap as clearance. The scraper cages are rigidly affixed to the first tier 19 of the support stand, whereas the electrodes 17, 18 are mounted for vertical movement inside the scraper cages. The electrodes extend from a common yoke 24 which is secured in a movable fashion to a second tier 25 of the support stand. The electrodes pass through openings in the first tier 19 of the stand above the scraper cages 22, 23, and extend into the space inside the scraper cages. The fit is sufficiently loose to permit movement of the electrodes within the cages, but with a sufficiently small gap that effective removal of deposited solids is achieved by the movement.

The yoke 24 which joins the electrodes is suspended from the second tier 25 of the support stand by a movable rod 26 whose motion is controlled by an air cylinder 27, which may for example be a double-acting short stroke actuator cylinder. The movable rod 26 is shown in the extended position. Upon command by the appropriate signal, the actuator cylinder 27 retracts the rod 26, moving the electrodes upward inside the stationary scraper cages. The actuator cylinder holds the rod in this retracted position until a further signal actuates the return of the rod to the extended position. It will be clear from the drawing that only a short range of motion of the rod is needed for the electrodes to move sufficiently to be scraped by the scraper cages.

Figure 2:
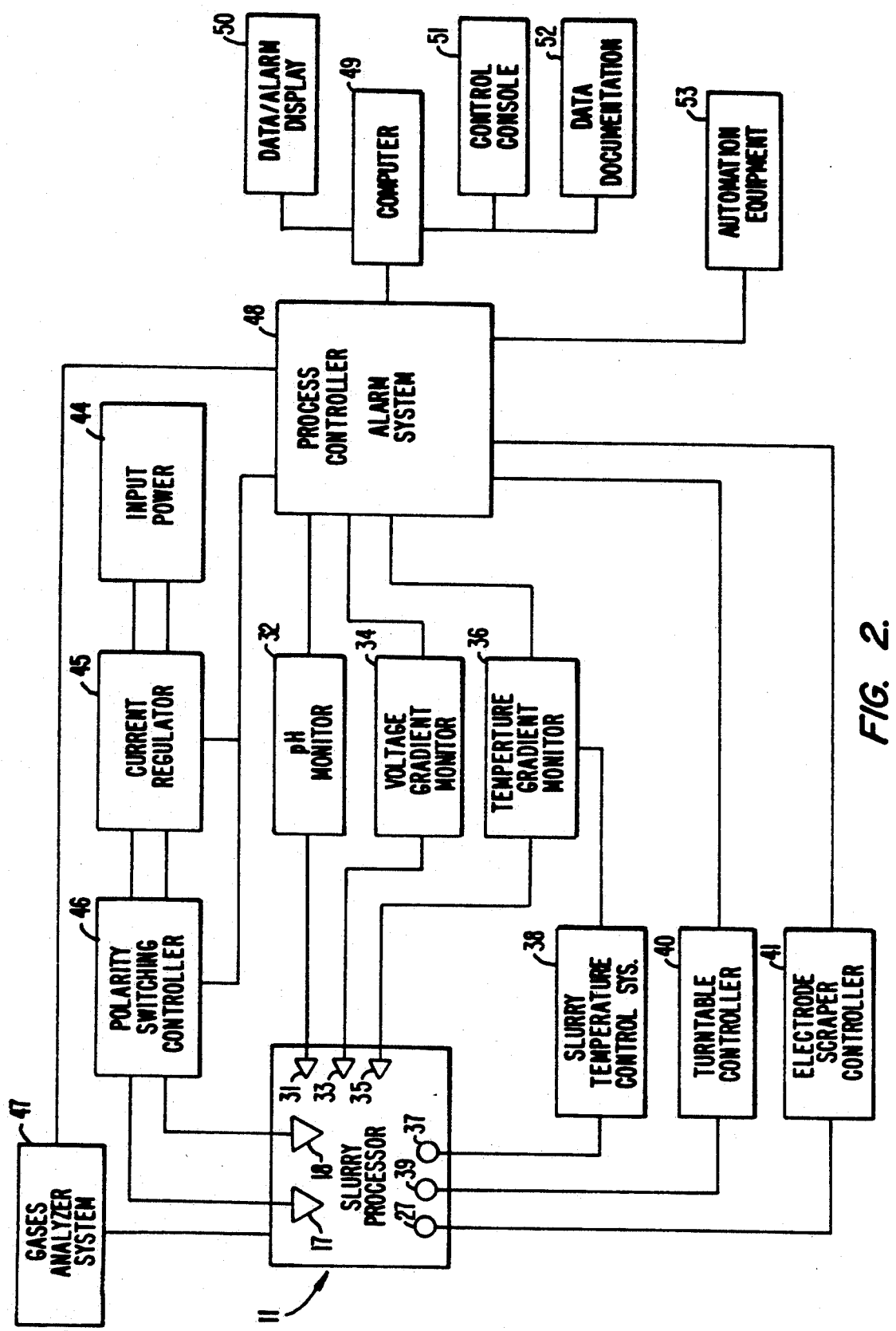
FIG. 2 is a block diagram of a system for driving, controlling and monitoring the processor of FIG. 1.

FIG. 2 represents a system diagram for the operation of a desensitizing processor of the type shown in FIG. 1. The electrolytic cell 11 is shown, with the electrodes 17, 18. Also included are a pH probe 31 extending into the slurry, and an associated pH monitor 32; a voltage sensor 33 or pair of sensors, one attached to each of the scraper cages, and an associated voltage gradient monitor 34 for monitoring the voltage gradient between the electrodes; a temperature detector 35 or pair of detectors, one attached to each scraper cage, and an associated temperature gradient monitor 36 for monitoring the temperature gradient in the slurry; a heat exchanger 37 and an associated temperature control system 38 controlled by the temperature gradient monitor 36; a turntable drive 39 controlled by a turntable controller 40; and the electrode actuator cylinder 27 controlled by an actuator controller 41.

Electric power supplied by a power source 44 is controlled by series current regulators 45 and a polarity switching controller 46. A gas analyzer system 47 is also included to monitor the gas composition above the slurry. Each of these units is governed by a process controller and alarm system 48, which is in turn controlled by a computer 49 equipped with a data/alarm display 50, a control console 51, and a unit for data documentation 52. An automation unit 53 further provides the system with the capability of automated operation.

Figure 3:
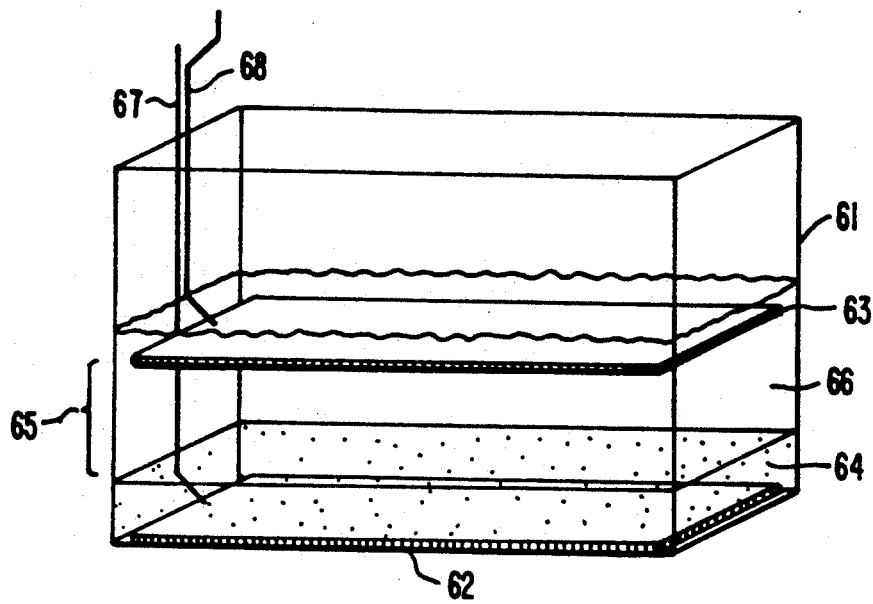
FIG. 3 is a perspective view of an additional cell, different from that of FIG. 1., but which can be used in the same type of process.
Figure 4:
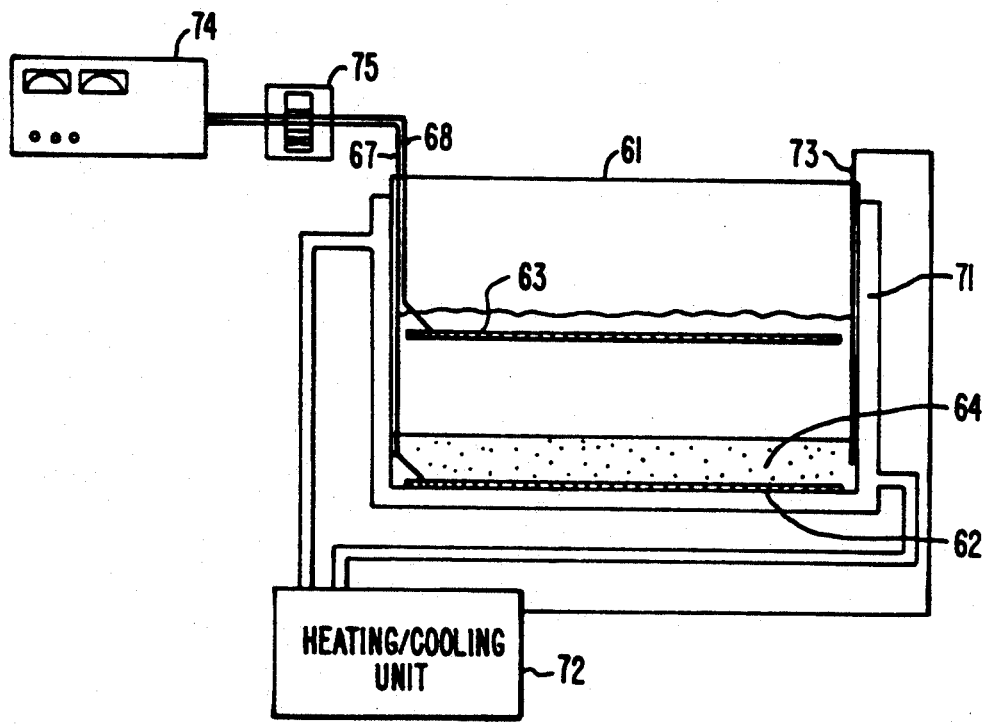
FIG. 4 is a diagram showing the cell of FIG. 3 in combination with electrical and temperature control systems.

A second example of an electrolytic cell in which the invention may be performed is shown in FIG. 3, and this second cell is shown together with power supply and temperature control systems in FIG. 4. As shown in FIG. 3, this cell is a rectangular open-top tank 61, preferably made of a transparent electrically and chemically inert material such as glass. One electrode 62 is a planar rectangular electrode positioned horizontally at the bottom of the tank, and the other electrode 63 is a second planar rectangular electrode of the same size as the first, positioned horizontally inside the tank at a level above the first. The slurry of macerated propellant (or similar composition) 64 is placed above the lower electrode 62, leaving a gap 65 between it and the upper electrode 63. The gap is filled with water 66 which also covers the upper electrode 63. Liquor from the propellant maceration operation may be used as the water. The two electrodes are electrified by appropriate voltage supply lines 67, 68. In the arrangement shown, the lower electrode 62 serves as the cathode and the upper electrode 63 serves as the anode.

Either electrode may be a continuous solid plate or a plate of grill-type or honeycomb-type structure, in all cases preferably flat. Since gas bubbles are normally generated during the electrolysis, it is preferable that the upper plate be of a grill-type or honeycomb-type structure to permit the gas bubbles to escape. Alternatively, the upper plate may be a continuous solid tilted slightly to accelerate the escape of the bubbles. The plate size is not critical for either of the two plates. Successful results have been obtained with plate sizes ranging from 2 to 40 square inches (13–258 $cm^2$), although larger plates may also be successfully used.

The FIG. 4 drawing shows the cell inside a temperature control jacket 71. Circulation of the coolant through the jacket and control of the coolant temperature is achieved by a heating/cooling unit 72 which relies on a thermocouple probe 73 extending inside the cell, the probe being coated with a layer of non-conductive material. The unit will contain a pump, controls for setting a setpoint temperature, and a heating and/or cooling mechanism, and may be of conventional construction and operation. The voltage supply lines 67, 68 are fed by a power supply 74 through a polarity switch 75 which permits the operator to select which of the electrodes is the anode and which the cathode and to switch back and forth between them.

The system shown in FIGS. 3 and 4 may be operated in a variety of ways, depending on the nature of the propellant being treated and what types of desensitization reactions are required. In a typical operation, macerated propellant is placed on the lower electrode 62 in a layer of uniform thickness, and the upper electrode 63 is then suspended (by conventional suspending means) above the propellant layer. The gap 65 between the upper surface of the propellant layer and the lower surface of the upper electrode will be at least about 0.5 inch (1.27 cm) in most cases to provide best results, and preferably about 1.0 inch (2.54 cm).

Figure 5:
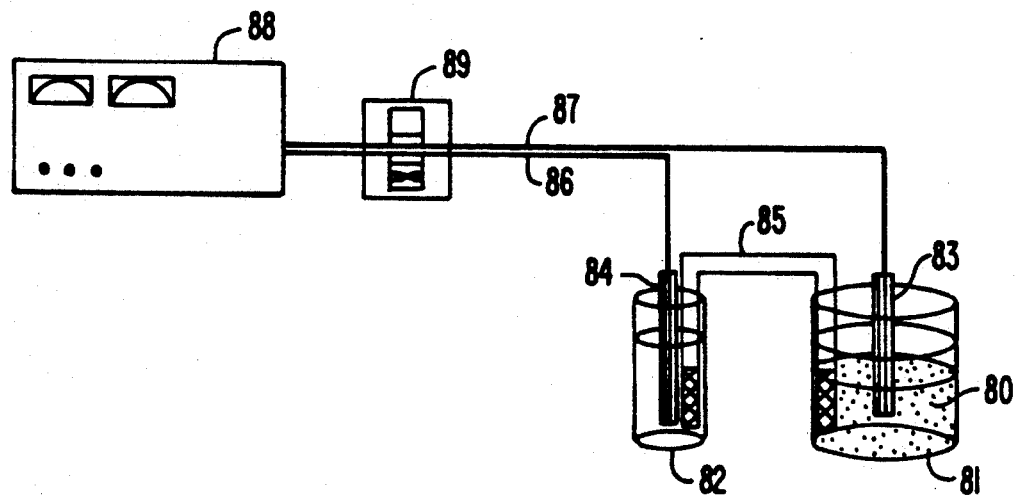
FIG. 5 is a diagram showing a third type of cell which can be used in processes of the present invention.

A third example of an electrolytic cell system is shown in FIG. 5. This system consists of two half cells, which may be referred to for convenience as a primary half cell 81 and a secondary half cell 82. A working electrode 83 extends into the primary half cell 81, and a reference electrode 84 extends into the secondary half cell 82. The two half cells are connected by an electrolyte bridge 85. The electrodes and electrolyte bridge are of conventional materials and construction. Electrical leads 86, 87 supply voltage to the electrodes from a power supply 88, and the polarity of the leads is controlled by a polarity switch 89, as in FIG. 4. Macerated propellant 90 is placed only in the primary half cell 81. The secondary half cell 82 and the remainder of the primary half cell are filled with water, or with liquor left over from the maceration of the propellant, or any other conductive medium.

In a typical operation of a system such as that shown in FIG. 5, the desensitization process is begun by switching the polarity switch 89 to connect the electric supply line 87 which supplies voltage to the working electrode 83 to the positive pole of the power supply 88, causing the primary cell to function as an anode, while simultaneously connecting the reference electrode 84 to the negative pole of the power supply. The anodic reaction in the primary half cell causes the oxidizing agents in the macerated propellant to attack the binder material in the propellant, causing the propellant to swell.

The swelling provides an increased access to the energetic compounds that were bound with the binder material. Once swelling has occurred, the polarity of the electrodes is reversed by the polarity switch to produce a cathodic reaction in the primary half cell. This results in the desensitization of the energetic compounds.

Figure 7:
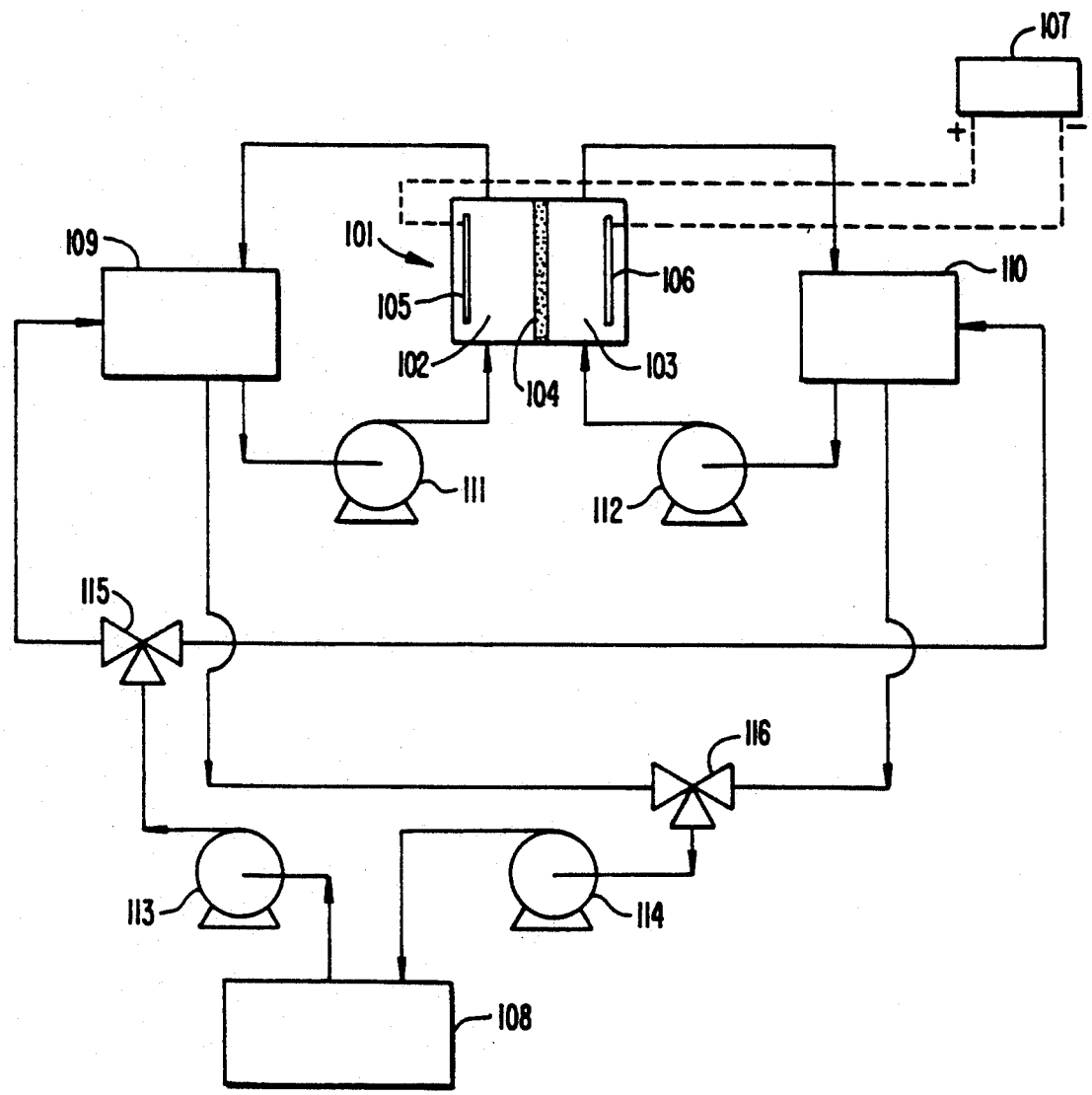
FIG. 7 is a diagram of an electrolytic cell system in accordance with the invention in which the energetic composition is retained outside the cell.

The system shown in FIG. 7 includes an electrolysis cell 101 which is divided into anodic 102 and cathodic 103 half-cells separated by an ion-permeable membrane 104. An anode 105 resides in the anodic half-cell and a cathode 106 resides in the cathodic half-cell, the anode and cathode energized by a power supply 107. The membrane 104 is constructed of any conventional membrane material which permits the passage of ions generated in the electrolysis and yet is capable of withstanding the strong acids and bases produced by the electrolysis reactions and otherwise present in the system. The slurry containing the energetic composition to be desensitized is retained in a separate reaction vessel 108 apart from the electrolysis cell.

Other components of the system are an acid storage tank 109 for the acidic oxidizing agent formed in the anodic half-cell; a base storage tank 110 for the basic reducing agent formed in the cathodic half-cell; a circulation pump 111 for circulating the acid solution between the acid storage tank 109 and the anodic half-cell 102; a second circulation pump 112 for circulating the base solution between the base storage tank 110 and the cathodic half-cell 103; third and fourth circulation pumps 113, 114 for circulating the acid and base solutions between their respective storage tanks and the reaction vessel 108; and two three-way valves 115, 116 with shut-off to select which of the two solutions will be circulated through the reaction vessel.

The system of FIG. 7 may be operated in a variety of ways. The following is a description of a presently preferred method of operation.

The reaction vessel 108 is charged with an aqueous slurry of solid propellant material, following maceration of the propellant to a particle size on the order of 0.25 inch (0.64 cm) or less. A typical slurry is one having a volume increased to about 1.6 times relative to the dry propellant. The optimal slurry consists of all water-insoluble components of the propellant such as the polymeric binder, plasticizers, nitramines or other energetic components, and aluminum or other fuels, and minimal amounts at most of water-soluble components which have dissolved in the liquid phase. The solids will however contain water-soluble species which are retained in the solids matrix by the binder.

The acid and base storage tanks 109, 110 are charged with aqueous solutions of a portion of the water-soluble components of the propellant. The waste water generated by the hydromining and/or maceration procedures is particularly convenient for use in this initial charge of the acid and base storage tanks, since a portion of the water-soluble fraction of the propellant dissolves in the water used in these procedures. This fraction includes, for example, oxidizing agents such as ammonium perchlorate and ammonium nitrate.

Once the tanks are loaded, the aqueous solutions in the acid and base storage tanks 109, 110 are simultaneously circulated through anodic and cathodic half-cells 102, 103 of the electrolysis cell, and a current is passed through the cell. During this phase, strong oxidizing agents and acids are generated in the anodic half-cell, and strong reducing agents and alkalies are generated in the cathodic half-cell, and in each case, are circulated through the respective storage tanks. Examples of the types of electrolytic reactions occurring are as follows:

In the anodic half-cell:
(1) The conversion of ammonium ion to nitrate ion;
(2) The conversion of water to hydrogen peroxide; and
(3) The generation of hydrogen ions from water and from each of the above two conversions; and In the cathodic half-cell:
(1) The conversion of chlorate ion to chloride ion;
(2) The conversion of nitrate and nitrite ions to ammonia; and
(3) The generation of hydroxyl ions from water and from each of the above two conversions.

The electrolysis and circulation of the solutions through the anodic and cathodic half-cells is continued until the pH in the acid storage tank drops to a desired level and the pH in the base storage tank rises to a desired level. In most applications, preferred results are achieved when the desired level in the acid storage tank is about 3.0 or less, preferably about 1.5 or less, and the desired level in the base storage tank is about 8.0 or above, preferably about 9.5 or above. In a presently preferred method, the desired levels are 1.0 or less in the acid storage tank and 10.0 or above in the base storage tank. In applications where waste water does not achieve the desired pH levels on its own, the waste water may be supplemented, or replaced, by materials which will provide stronger acids or bases.

Once the desired pH levels are achieved, the two circulation pumps 113, 114 controlling circulation through the reaction vessel 108 are activated, with the three-way valves 115, 116 arranged such that circulation is begun between the acid storage tank 109 and the reaction vessel. The circulation of the oxidizing agents through the electrolytic cell may be suspended while circulation is occurring through the reaction vessel. In the preferred practice of this process, however, the circulation of the oxidizing agents through the reaction vessel is done while the two circulation loops between the acid and base storage tanks and the two halves of the electrolysis cell are still in operation.

In the reaction vessel, the strong oxidizing acids from the acid storage tank react with the polymeric binder material and the organic nitro-, nitrato- or nitramine-group-bearing compounds in the propellant to convert these compounds to low molecular weight oxidation products. Oxidation of other components of the propellant such as crosslinkers, plasticizers and stabilizers occurs as well. Gases produced during this procedure are drawn off and scrubbed by conventional means. Simultaneously, the oxidizing agents circulating through the reaction tank are reduced. With circulation of the contents of the acid storage tank 109 through the anodic half cell 102 at the same time, the reduced oxidizing agents are continuously regenerated to maximize their oxidation capabilities in the reaction vessel 108.

With the decomposition of the binder material, propellant components initially bound by the binder are liberated and exposed for chemical attack. The three-way valves 115, 116 are then switched to circulate the basic reducing solution from the base storage tank 110 through the reaction vessel 108. The reducing solution reacts with and decomposes any nitrato ester or nitramine not previously oxidized by the acidic oxidizing solution. The products of this decomposition include water-soluble nitrite, nitrate, acetate and formate salts, which are circulated back to the base storage tank 110. As in the oxidation phase, the circulation of basic reducing solution through the cathodic half-cell 103 is preferably continued during the circulation of the same solution through the reaction vessel, thereby providing continuous regeneration of the base.

The length of time required for which each of the two phases involving circulation through the reaction vessel is not critical and may vary. Optimal lengths of time will vary with the propellant composition, the particular types of binder material and other components of the composition, the proportions of each and the physical condition of the solid particles in the slurry. In most cases, best results will be achieved by continuing the oxidation phase for from about 2 hours to about 24 hours. The reduction phase may then be performed for a greater or lesser time period. It is presently contemplated that the most typical operation will involve a reduction phase which is from about one-third to about one-fourth the duration of the oxidation phase.

The oxidation and reduction cycles may be repeated in alternating manner. In most cases, however, a single cycle of each will be sufficient for desensitization of the propellant.

Once the propellant has been desensitized to a condition acceptable for disposal, the pH of the contents of the reactor vessel contents may be adjusted by the addition of supplemental acid or base as needed to achieve a neutral pH. The remaining solids may then be removed from the reaction vessel and incinerated or otherwise disposed of by conventional means.

The following examples are offered strictly for purposes of illustration. They are intended neither to limit nor to define the invention in any manner.

EXAMPLE 1

This example illustrates the desensitization of a propellant composition by use of the present invention. The propellant composition was as follows:

TABLE I

| Propellant Composition | |
| --- | --- |
| Component | Weight Percent |
| ammonium perchlorate | 10.8 |
| cyclotetramethylene tetranitramine (HMX) | 10.8 |
| nitrocellulose (NC) | 21.6 |
| nitroglycerin (NG) | 29.6 |
| aluminum | 19.8 |
| triacetin (glycerol triacetate) | 5.3 |
| 2-nitrodiphenylamine | 1.0 |
| resorcinol | 1.1 |
| | 100.0 |

To conduct the desensitization, the propellant composition was macerated and combined with water to form a slurry, of which the final water content was 45% by weight. The slurry was then placed in an electrolytic cell apparatus consisting of a 400-mL beaker of nonconductive material with two aluminum electrodes spaced 4 cm apart and a source of direct current. The amount of slurry charged to the beaker was 155 mL. Direct current was applied at a current density of 0.02 amps/cm$^2$, and maintained for four days. During this time, the mixture was manually mixed three times per day and water was added as necessary to maintain the initial liquid level.

At the end of the four-day period, the current was turned off and the slurry removed from the plastic container. Water was then removed from the slurry by decantation and evaporation, to return the propellant materials to solid form. Analyses and standard sensitivity tests were then performed to compare the treated material with the starting material prior to being formed into the slurry. The analyses included determinations of the levels of ammonium perchlorate, HMX and NG, and the sensitivity tests included a Naval Ordinance Laboratory Card Gap Test and a Bureau of Mines Dropweight Impact Test. Each of the sensitivity tests was conducted according to standard procedures well known and readily available to those skilled in the art. The Card Gap Test was conducted using zero cards. The term "positive" in the Card Gap Test indicates detonation under the conditions used in the test, and the term "negative" indicates lack of detonation. In the Impact Test, the value given is the minimum height from which a 2-kg weight dropped onto the sample caused the sample to detonate, an increase in the value representing a loss in sensitivity. The results of all tests comparing the material before and after the electrolysis are listed in Table II.

TABLE II

| Results of Desensitization | Before | After |
|---|---|---|
| Composition, weight %: | | |
| ammonium perchlorate | 29.6 | 1.3 |
| HMX | 10.8 | 2.3 |
| NG | 10.8 | 2.4 |
| Initiation Properties: | | |
| Detonability (Card Gap Test) | positive | negative |
| Impact, cm | 16.6 | 44.3 |

The data in Table II clearly show the loss in sensitivity brought about by electrolysis practiced in accordance with the present invention.

EXAMPLE 2

This example is a further illustration of the desensitization of a propellant composition by use of the present invention, this time using a catalyst and showing the depletion rate of nitroglycerin.

The propellant composition was the same as that used in Example 1, and as in Example 1, the composition was macerated and combined with water to form a slurry having 45% by weight water. The slurry was placed in four cells similar to those depicted in FIG. 1; the volumetric capacity of each cell was 1 liter, and the amount of slurry charged to each cell was 600 mL. Each cell contained an anode and cathode, each 6 inches (15.2 cm) in length and 0.5 inch (1.3 cm) in diameter, and spaced apart by a distance of 2 inches (5.1 cm). The cathode was a titanium electrode with an iridium oxide coating.

Direct current at 1.3 amps was applied and maintained for a period of time which differed for each cell—2, 4, 8 and 24 hours in length, respectively. During each period, the cell and its contents were left undisturbed; no mixing occurred. The current was then turned off and the slurries were removed from the cells and dried to solid form.

Figure 6:
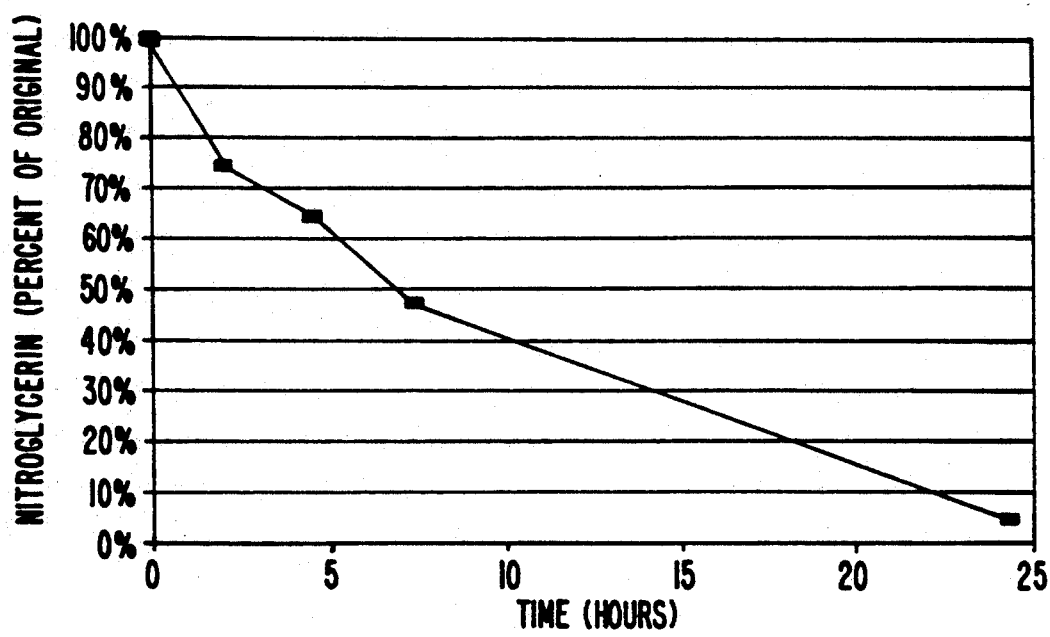
FIG. 6 is a plot of nitroglycerin content vs. time in a propellant composition undergoing desensitization in accordance with the invention.

Analyses and standard sensitivity tests were performed on each treated and dried sample to compare the treated material with samples of material identical to the starting material before it had been formed into a slurry. The analyses included a determination of the weight percent of NG and a Bureau of Mines Dropweight Impact Test, according to the same procedure used in Example 1. The results of these tests are shown in Table III below, and the nitroglycerin depletion in terms of percent of the original amount is plotted in FIG. 6.

TABLE III

| Results of Desensitization | | After | | | |
|---|---|---|---|---|---|
| | Before hours: | 2 | 4 | 8 | 24 |
| Nitroglycerin, weight %: | 29.6 | 22.0 | 19.0 | 14.0 | 1.4 |
| Impact, cm: | 14.5 | 20.1 | 19.4 | 18.2 | 63.0 |

The data in Table III clearly show a gradual loss in sensitivity attributable to the process of the invention.

The apparatus and system depicted and described herein are merely illustrative. Modifications, variations, and alternative arrangements and designs which, although differing from that described above, still embody the basic concepts and spirit of the invention will be readily apparent to those skilled in the art.

What is claimed is:

1. A process for treating a composition containing one or more energetic compounds bound together by a polymeric binder, said energetic compounds including at least one member selected from the group consisting of nitro-group-bearing, nitramine-group-bearing and nitrato-group-bearing compounds, to substantially reduce the sensitivity of said composition to inadvertent initiation, said process comprising:
   (a) placing said composition in contact with a first electrode in an electrolytic cell which further contains a liquid medium connecting said first electrode and a second electrode in said cell;
   (b) with said first electrode energized as an anode, passing an electric current between said first and second electrodes to at least partially oxidize said binder; and
   (c) subsequent to step (b), energizing said first electrode as a cathode and passing an electric current between said first and second electrodes to reduce at least a portion of said energetic compounds.

2. A process for treating a composition containing one or more energetic compounds bound together by a polymeric binder, said energetic compounds decomposable by oxidation, to substantially reduce the sensitivity of said composition to inadvertent initiation, said process comprising:
   (a) placing said composition in contact with a first electrode in an electrolytic cell which further contains a liquid medium connecting said first electrode and a second electrode in said cell; and
   (b) with said first electrode energized as an anode, passing an electric current between said first and second electrodes to at least partially oxidize said binder and to at least partially oxidize said energetic compounds.

3. A process in accordance with claims 1 or 2 in which step (a) comprises placing said composition in contact with said first electrode but not said second electrode.

4. A process in accordance with claims 1 or 2 in which said liquid medium is a member selected from the group consisting of an aqueous medium, low molecular weight alcohols and ketones.

5. A process in accordance with claims 1 or 2 in which said liquid medium is an aqueous medium.

6. A process for treating a composition containing one or more energetic compounds selected from the group consisting of nitro-group-bearing, nitramine-group-bearing and nitrato-group-bearing compounds, bound together by a polymeric binder, to substantially reduce the sensitivity of said composition to inadvertent initiation, said process comprising:
- (a) contacting said composition with an aqueous liquid to extract water-soluble components therefrom, thereby forming an aqueous solution of water-soluble components of said composition, and dividing said aqueous solution into first and second portions;
- (b) combining components of said composition which were not extracted in step (a) with an aqueous liquid to form a slurry;
- (c) circulating said first portion of said aqueous solution through an anodic half-cell, and said second portion through a cathodic half-cell separated from said anodic half-cell by an ion-permeable barrier, while passing an electric current across said anodic and cathodic half-cells through said ion-permeable barrier, to generate an acidic solution of oxidizing agents in said anodic half-cell and a basic solution of reducing agents in said cathodic half-cell;
- (d) contacting said slurry with said acidic solution in a reactor vessel to cause oxidative decomposition of solid binder materials in said slurry, thereby exposing energetic compounds retained by said binder for chemical attack; and
- (e) once said energetic compounds are exposed, contacting said slurry with said basic solution to cause reductive decomposition of said energetic components thus exposed.

7. A process in accordance with claim 6 in which step (c) comprises circulating said first portion of said aqueous solution between said anodic half-cell and a first retaining vessel, and circulating said second portion between said anodic half-cell and a second retaining vessel.

8. A process in accordance with claim 7 in which step (d) comprises circulating said acidic solution between said first retaining vessel and said reactor vessel, and step (e) comprises circulating said basic solution between said second retaining vessel and said reactor vessel.

9. A process in accordance with claim 8 in which step (b) is continued during the performance of step (c).

10. A process in accordance with claim 8 in which step (b) is continued during the performance of steps (c) and (d).

11. A process in accordance with claim 7 in which step (d) is begun only when the pH in said first retaining vessel drops to about 3.0 or below.

12. A process in accordance with claim 7 in which step (d) is begun only when the pH in said first retaining vessel drops to about 1.5 or below.

13. A process in accordance with claim 7 in which step (e) is begun only when the pH in said second retaining vessel rises to about 8.0 or above.

14. A process in accordance with claim 7 in which step (e) is begun only when the pH in said second retaining vessel rises to about 9.5 or above.

15. A process in accordance with claim 6 in which said electric current of step (c) has a current density of from about 0.01 amps/cm$^2$ to about 0.20 amps/cm$^2$.

* * * * *